Aug. 22, 1950     T. R. FISHER     2,519,959
CLIP-ON EYESHIELD
Filed April 13, 1949
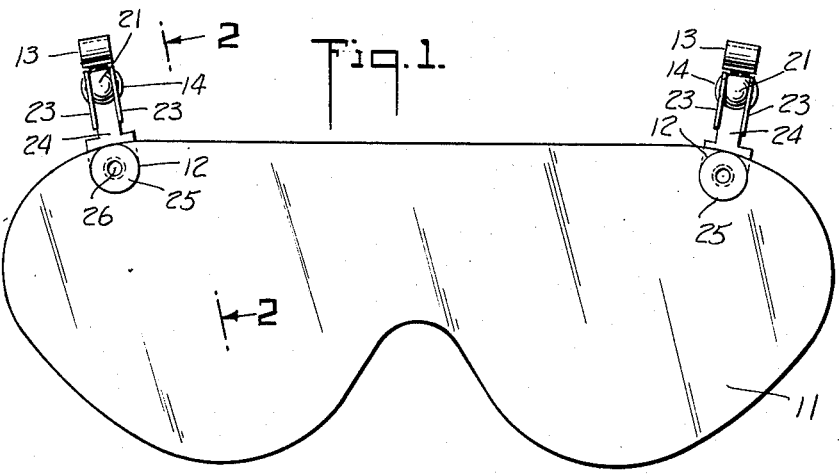
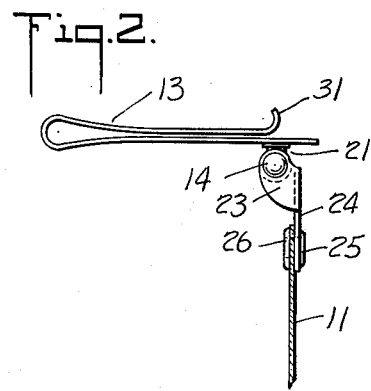
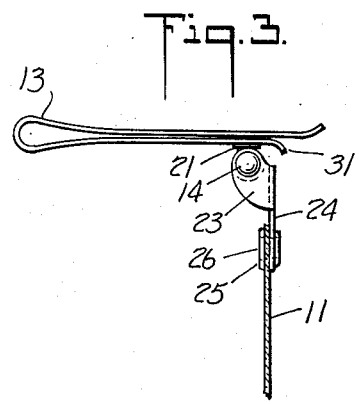
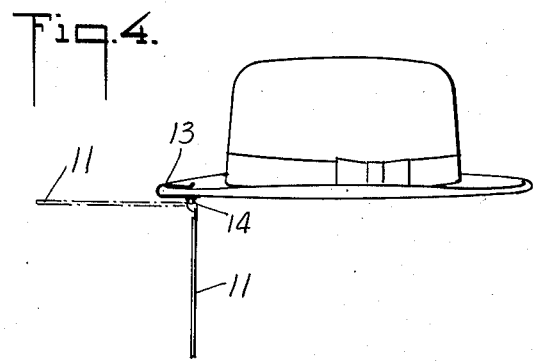
THEODORE R. FISHER
INVENTOR
BY
ATTORNEY Patented Aug. 22, 1950

2,519,959

UNITED STATES PATENT OFFICE 2,519,959

CLIP-ON EYESHIELD

Theodore R. Fisher, Tampa, Fla.

Application April 13, 1949, Serial No. 87,317

1 Claim. (Cl. 2—10)

My invention relates to eye shields of the kind adapted for use in shielding the eyes from the brilliant rays of the sun or other high power lights and has for its object to produce an eye shield that may be clipped to the brim of a hat or peak of a cap and be easily removable so as to be carried in the pocket when not in use.

A further object is to provide a clip that will securely hold the eye shield in place in front of the eyes without contact with glasses worn by the wearer or touching his face and provide adjustment in any plane from the vertical to horizontal.

A further object is to provide a clip that is of simple construction, light in weight and economical in production, and one that may be confined in a small space.

The foregoing and other features of my invention will now be described in connection with the accompanying drawing forming part of this specifications in which I have illustrated my clip-on eye shield in its preferred form, after which I shall point out in the claim those features which I believe to be new and of my own invention.

In the drawing:

Figure 1 is a view of my eye shield looking from the front.

Figure 2 is a section along the line 2—2, Figure 1.

Figure 3 is a modification of the spring clip employed.

Figure 4 shows a side view of a hat with the eye shield clipped to the brim for use.

In the carrying out of my invention I employ a sheet of transparent material 11 which is suitably shaped conforming to standard optical requirements and tinted to serve as a shield for the eyes of the user. This material is preferably polarized to relieve strain on the eyes and made of plastic to insure lightness and durability.

At suitable points 12 on the upper edge of the shield 11, spring clips 13 are attached thereto by movable joints 14 such as ball and socket, as illustrated. I have shown a preferred ball and socket joint. The ball 21 is firmly held between substantially semi-spherical recesses 22 impressed in two legs 23 which are bent upward from the body and toward each other holding the ball therebetween forming the socket for the joint. The body portion 24 is provided with an enlarged flange 25 by means of which the socket portion is secured to the shield 12 through rivets 26.

It will be observed that the U-shaped clips are elongated with the arms sprung together as clearly shown in Figure 2. It will also be observed that one of the arms of the U portion is longer than the other opposing arm, while the shorter arm is turned up as at 31, flaring away from the longer arm. This is an important feature for it allows the brim of the hat to be readily slipped in between the arms when putting the shield on the hat for use.

I wish it distinctly understood that my clip-on eye shield herein illustrated and described is in the form in which I desire to construct it and that changes or variations may be made as may be desirable or convenient without departing from the salient features of my invention and I therefore intend the following claim to cover such modifications as naturally fall within the lines of invention.

I claim:

A device of the class described in combination, an eye shield, a plurality of clips fastened independently to the top edge thereof, each clip comprising an elongated U-shaped member, the arms being sprung together, with one arm substantially longer than the other arm, the shorter arm provided with a turned up end flaring away from the longer arm, a ball and socket joint connecting the U-shaped member with the shield, the ball portion being substantially at the end of one leg of the U-shaped portion, and the socket being fastened to the eye shield whereby the clips can be independently rotated horizontally to spread the weight of the shield over a wide portion of the hat brim.

THEODORE R. FISHER.

REFERENCES CITED

The following references are of record in the file of this patent:

UNITED STATES PATENTS

| Number | Name | Date |
| --- | --- | --- |
| 1,502,661 | Fieber | July 29, 1924 |
| 1,857,284 | Nelson | May 10, 1932 |
| 1,955,232 | Gallaway | Apr. 17, 1934 |
| 2,434,076 | Kilham | Jan. 6, 1948 |

FOREIGN PATENTS

| Number | Country | Date |
| --- | --- | --- |
| 476,306 | France | July 27, 1915 |